(12) United States Patent
Trzaskos et al.

(10) Patent No.: US 9,070,313 B2
(45) Date of Patent: Jun. 30, 2015

(54) HIGH STRENGTH COSMETIC LOGO CONSTRUCTION

(75) Inventors: Piotr S. Trzaskos, Saratoga, CA (US); Jeremy C. Franklin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 928 days.

(21) Appl. No.: 13/244,111

(22) Filed: Sep. 23, 2011

(65) Prior Publication Data

US 2013/0077217 A1    Mar. 28, 2013

(51) Int. Cl.
| | |
|---|---|
| *H05K 5/00* | (2006.01) |
| *G09F 23/00* | (2006.01) |
| *G09F 7/06* | (2006.01) |
| *G09F 7/08* | (2006.01) |
| *G06F 1/16* | (2006.01) |

(52) U.S. Cl.
CPC ............ *G09F 23/00* (2013.01); *Y10T 29/49002* (2015.01); *G06F 1/1633* (2013.01); *G06F 1/1656* (2013.01); *G09F 7/06* (2013.01); *G09F 7/08* (2013.01)

(58) Field of Classification Search
CPC .............. B65D 51/245; B65D 2203/00; B65D 2543/00092; G09F 23/00; G09F 7/06; G09F 7/08; Y10T 29/49002; G06F 1/1633; G06F 1/1656

USPC ................. 361/679.55; 40/311, 315, 336
See application file for complete search history.

(56) References Cited

U.S. PATENT DOCUMENTS

| | | | |
|---|---|---|---|
| 4,332,074 A | 6/1982 | Auld et al. | |
| 5,169,699 A | 12/1992 | Prince | |
| 6,422,037 B1 | 7/2002 | Benderly | |
| 7,365,968 B2 * | 4/2008 | Chen et al. | ............... 361/679.27 |
| 2004/0017627 A1 | 1/2004 | Tidemann | |

* cited by examiner

*Primary Examiner* — Robert J Hoffberg
*Assistant Examiner* — Hung Dang
(74) *Attorney, Agent, or Firm* — Downey Brand LLP (57) ABSTRACT

A cosmetic logo insert is adapted for fitting into an opening in the housing of an associated computing device, is formed from a single piece of metal, has a thickness less than about 0.8 mm, and provides by itself adequate shock impact and fire enclosure protection at the opening for internal device components. The insert can include a lower portion having a first circumferential shape in the form of a logo and an outer surface that is substantially flat and polished to a mirrored finish, and also an upper portion integrally formed with the lower portion and having a second circumferential shape that is larger than the first circumferential shape. A computing device can include an outer housing having a wall with a stepped and logo shaped opening, a processor located within the housing, and a cosmetic housing insert fitted into the wall opening.

20 Claims, 7 Drawing Sheets

HIGH STRENGTH COSMETIC LOGO CONSTRUCTION

TECHNICAL FIELD

The present invention relates generally to consumer computing devices, and more particularly to decorative yet functional aspects along the exterior regions of such consumer computing devices.

BACKGROUND

Sophisticated computers, displays, appliances and other electronic devices are developing at a rapid rate. There is an ever-present demand for improved appearance, functionality, and aesthetics in the newest devices. One area that can often be of interest to manufacturers is the ability to provide a logo, trademark or other cosmetic component at the exterior of a device. Although such items can serve to readily identify a product provider to consumers, it can be important that such items do not detract from the functional integrity and aesthetic appearance of the overall device. As consumer products become increasingly smaller and more complex, however, additional challenges can arise in presenting such logos, trademarks and other cosmetic components without compromising the structural integrity and overall appearance of a given device For example, some of the aesthetic appeal of an electronic device or other consumer product can be compromised if there are too many display elements, lights, indicators, logos, other cosmetic components and the like. In addition, it can tend to be more aesthetically pleasing if such items are presented in a smooth and integrated type of presentation along the exterior of a device, rather than as separate printings, stickers, labels or other separate items attached to the outside of the device. Such items can be integrated into and be a part of an exterior housing for a device, for example. Where devices are becoming smaller, and device housings are becoming thinner, however, such devices and techniques are often difficult or impossible to use.

While many designs and techniques used to provide cosmetic logos about the exterior of computing devices have generally worked well in the past, there is always a desire to provide further devices and techniques to allow for thinner yet functional and reliable cosmetic logos in a computing device.

SUMMARY

It is an advantage of the present invention to provide thinner yet functional, reliable and aesthetically pleasing cosmetic items, particularly for use as logos with a computing or other personal device. This can be accomplished at least in part through the use of a thin, integrated single piece insert having multiple layered portions, at least one of which is in the shape of a logo. This integrated single piece logo insert can be shaped to be inserted and fastened within a stepped opening in a device housing, such that it forms a part of the completed housing. The thin single piece insert can be formed from a high strength material, such as steel or aluminum, such that it provides by itself adequate shock impact, fire enclosure and/or electromagnetic shield protection for the opening it fills.

In various embodiments of the present invention, a cosmetic logo insert adapted for use with an associated computing device can include a lower portion having a first circumferential shape in the form of a logo and an outer surface that is substantially flat and polished to a mirrored finish, as well as an upper portion that is integrally formed with the lower portion and having a second circumferential shape that is larger than the first circumferential shape. The cosmetic logo insert can be formed from a single piece of metal, can have a total thickness of less than about 0.8 mm and can be adapted to fit within an opening in the housing of the associated computing device to provide by itself adequate shock impact and fire enclosure protection at the opening for at least one internal device component of the computing device. The associated computing device can be a portable computing device.

In various further embodiments of the present invention, a computing device can include an outer housing adapted to contain a plurality of internal device components therein, a processor located within the outer housing, and a housing insert formed from a single piece of metal. The outer housing can include a wall having an outer surface, an inner surface and an opening having a logo shape therethrough, and the housing insert can take the logo shape and be fitted within the wall opening to form a part of a completed overall housing for the computing device. The housing insert can provide by itself adequate shock impact and fire enclosure protection at the opening for at least one of the plurality of internal device components. The housing insert can also provide adequate electromagnetic shield protection for the opening.

In various detailed embodiments, the thickness of both the housing insert and the wall proximate the opening is less than about 0.8 mm, and the thickness of the housing insert can be within the range of about 0.1 mm to about 0.8 mm. In addition, the cross-sectional area of the opening at the inner surface can greater than the cross-sectional area of the opening at the outer surface. The opening can be a stepped opening having an inner region proximate the inner surface and an outer region proximate the outer surface, wherein the inner region has a cross-sectional area that is greater or at least different than the cross-sectional area of the outer region.

In various detailed embodiments, the housing insert includes an upper portion having a first shape and at least one lower portion having a second shape that is smaller and at least partially concentric with the first shape. In some embodiments, the housing insert can include a plurality of separate lower portions. The difference in size between and relative arrangement of the first shape and the second shape of the upper and lower portions can result in a flange in the upper portion around the lower portion. Such a flange can be used to fit and attach the upper portion to a step within the opening. In various embodiments, the housing insert includes an outer surface that is substantially flat and polished to a mirrored finish.

In still further embodiments, a method of manufacturing a computing device is provided. Process steps can include forming an outer housing having an inner region and an opening through a wall thereof, placing a plurality of internal device components within the inner region of the outer housing, and fitting a cosmetic logo insert into the outer housing opening. The opening can have a shape in the form of a logo, and the cosmetic logo insert can be formed from a single piece of metal into the shape of the logo. In addition, the cosmetic logo insert can provide by itself adequate shock impact and fire enclosure protection at the opening for at least one of the plurality of internal device components.

In various detailed embodiments, the thickness of both the cosmetic logo insert and the wall proximate the opening is less than about 0.8 mm. In addition, the cosmetic logo insert can include an upper portion having a first shape and at least one lower portion having a second shape that is smaller and at least partially concentric with the first shape. Additional process steps can concern the formation of the cosmetic logo insert, including machining a master plate having the cosmetic logo insert contained therein, polishing a surface of the cosmetic logo insert, separating the cosmetic logo insert from the remainder of the master plate, and forming a coating on the polished surface of the cosmetic logo insert. Such a coating can be formed by way of particle vapor deposition, for example.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing high strength cosmetic logo construction for use in computing devices. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a computing device, such as any of the iMac® personal computer, MacBook® laptop computer or iPad® tablet computer manufactured by Apple Inc. of Cupertino, Calif. Although the subject computing device can be a portable computing device, including even portable media players and cellular telephones, it will be readily appreciated that the various embodiments of the present invention disclosed herein can also be used with larger personal computing devices, servers and the like. Further, the present invention can also be used in some instances in conjunction with other devices that are not even computing devices, as will be readily appreciated in view of the disclosure herein.

Figure 1A:
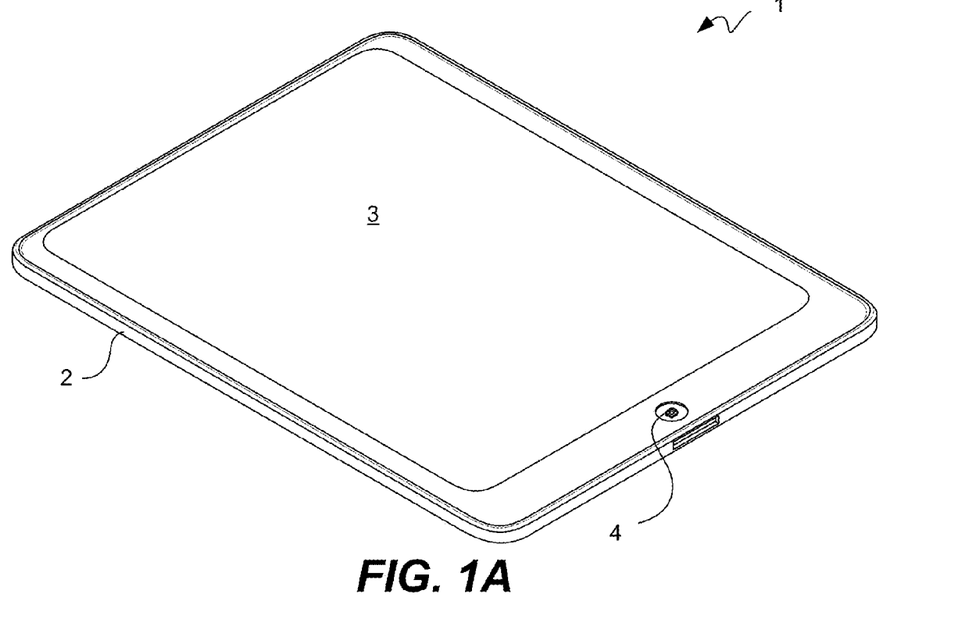
FIG. 1A illustrates in top perspective view an exemplary personal computing device.

Referring first to FIG. 1A, one example of a personal computing device in the form of a tablet computer is shown in top perspective view. As shown, tablet computer 1 can generally include an outer housing 2, and a cover glass 3 for providing a display therethrough. Various internal components (not shown) can be included within an inner cavity created by the outer housing 2 and cover glass 3 combination, which can include an internal display device, one or more processors, storage components, circuit boards, power supplies, and the like. A home button 4 and various other inputs, outputs, ports and the like can also be included on tablet computer 1, as will be readily appreciated. Tablet computer 1 can also include a visual display in the shape of a cosmetic logo on its obverse side (not shown). Such a cosmetic logo can take the form of an insert within the housing of the tablet computer, further details for which are provided below.

Figure 1B:
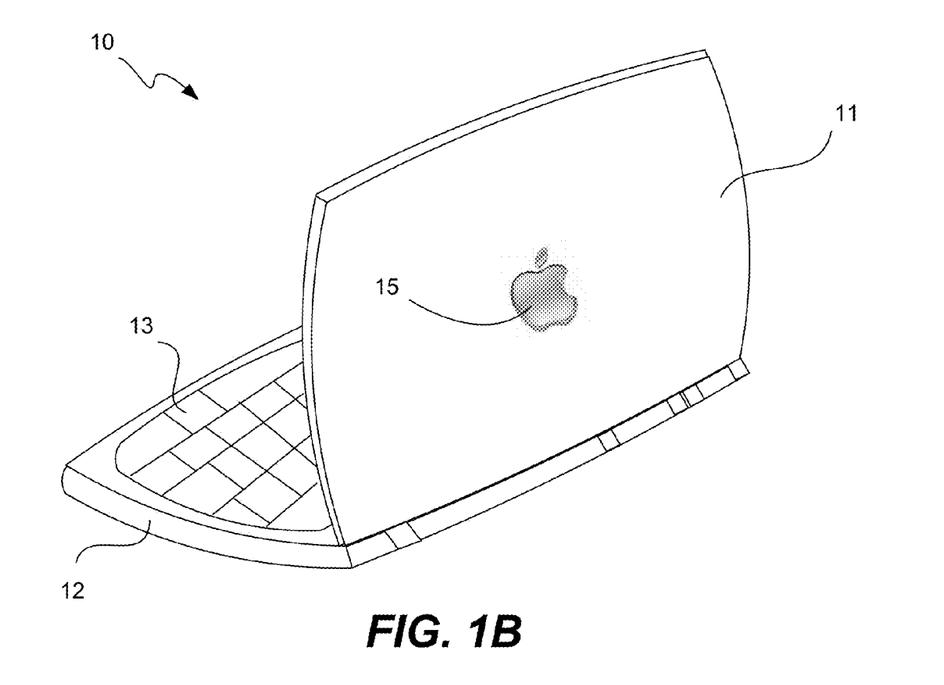
FIG. 1B illustrates in side perspective view an exemplary laptop computer in an open position and having a cosmetic logo on its top cover according to one embodiment of the present invention.

Turning next to FIG. 1B, an exemplary laptop computer in an open position and having a cosmetic logo on its top cover is shown in side perspective view. Laptop computer 10 can be, for example, a MacBook® laptop computer, although other brands and models of laptop computers are contemplated for use with the present invention. Laptop computer 10 can have a top cover 11, as well as a lower portion 12 that may include a keyboard 13. As shown, laptop computer 10 can also include a visual display 15 in the shape a cosmetic logo, such as the Apple® logo, for example. Although visual display 15 is in the shape of a cosmetic logo, it will be readily appreciated that a wide variety of shapes, sizes and types of visual displays may be used, and that such displays can be logos, trademarks, text, advertisements, or other general types of patterns or displays. Visual display 15 can actually be in insert that is fitted within an opening in the housing of top cover 11, as set forth in greater detail below.

Figure 2A:
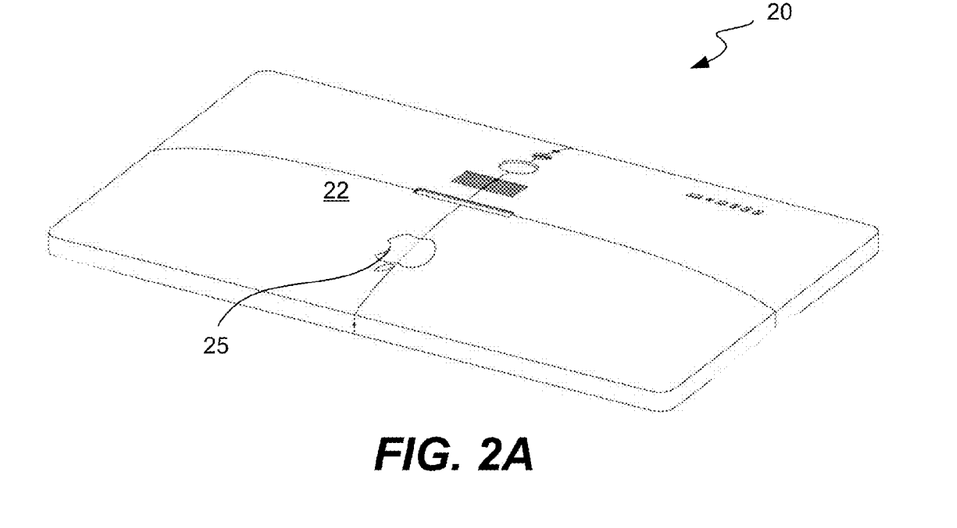
FIG. 2A illustrates in obverse perspective view an exemplary outer housing component of a personal computing device according to one embodiment of the present invention.

Continuing with FIG. 2A, an exemplary outer housing component of a different personal computing device is shown in obverse perspective view. Outer housing component 20 can be formed from a single piece of material, such as steel, aluminum or plastic, for example. Outer housing component 20 can include a substantial back portion having an outer surface 22, and be slightly convex in nature, although such curvature is not necessary. One or more vents, openings, ports or other features may be present at the outer surface of housing component 20, various details of which need not be covered herein. One such feature can be visual display 25, which can be in the shape of a cosmetic logo. Cosmetic logo 25 can take the form of an insert that is fitted within an opening through housing component 20, such that the cosmetic logo actually forms a part of the overall outer housing for the associated personal computing device.

Figure 2B:
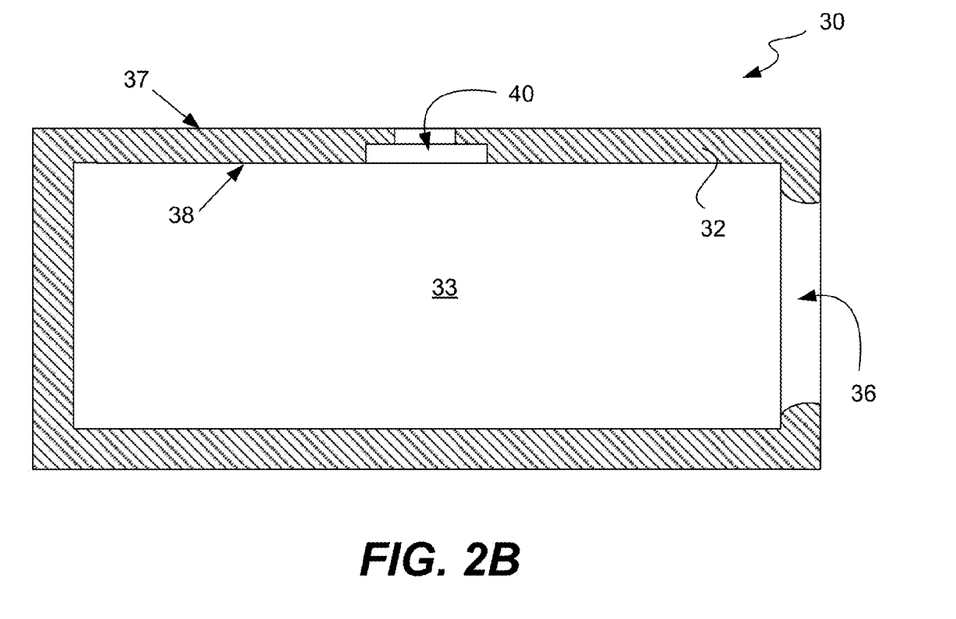
FIG. 2B illustrates in side cross-sectional view an exemplary opening in an outer housing component according to one embodiment of the present invention.

FIG. 2B depicts in side cross-sectional view one example of such an opening formed outer housing component. Outer housing 30 can form a substantial part of an enclosure for an associated computing device. Such an outer housing 30 can have one or more walls 32 having various openings 36 therethrough, with such openings being designed to accommodate displays, I/O components or access to the internal region 33 of the device, such as to facilitate device manufacture or repair. Such walls 32 can include an outer surface 37 and inner surface 38, as will be readily appreciated. In addition, a stepped opening 40 can be formed in wall 32 to facilitate the subsequent insertion of a cosmetic logo (not shown).

Figure 3A:
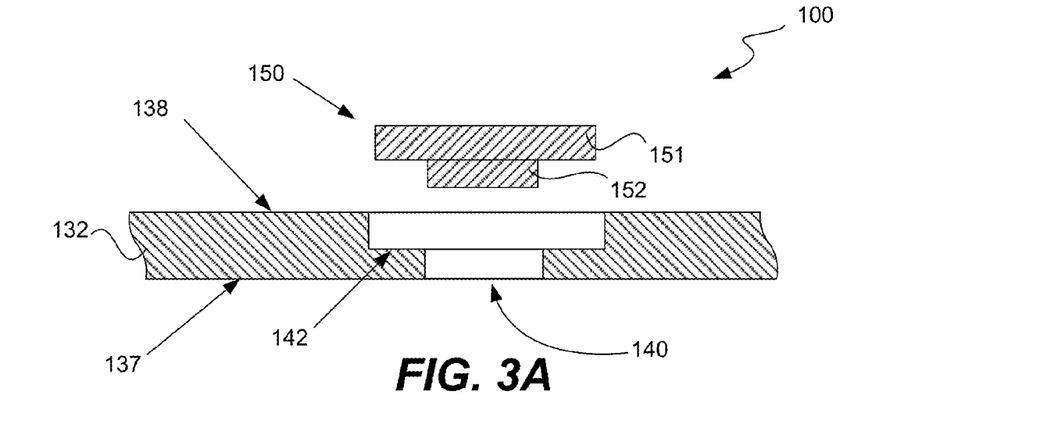
FIG. 3A illustrates in side cross-sectional view an exemplary opening in an outer housing component and an exemplary associated cosmetic logo insert sized for the opening according to one embodiment of the present invention.

Turning next to FIG. 3A, an exemplary opening in an outer housing component and an associated cosmetic logo insert sized for the opening are illustrated in side cross-sectional view. Arrangement 100 can include outer housing wall 132, which can be a portion of a larger outer housing for a computing device. Housing wall 132 can include an outer surface 137 proximate the exterior of the computing device and an inner surface 138 proximate an interior region of the device.

In addition, a stepped opening 140 can be formed in housing wall 132. As shown, stepped opening 140 can include a larger inner region proximate the inner surface and a smaller outer region proximate the outer surface. The inner region has a cross-sectional area that is greater than the cross-sectional area of the outer region, and the opening at the inner surface is larger than the opening at the outer surface. A step 142 can be formed in stepped opening 140, and such a step can be used to fasten an associated cosmetic logo insert 150 that is fitted into the opening. As shown, cosmetic logo insert 150 includes an upper portion 151 having a first shape and at a lower portion 152 that is smaller than the upper portion and can have a second shape.

Figure 3B:
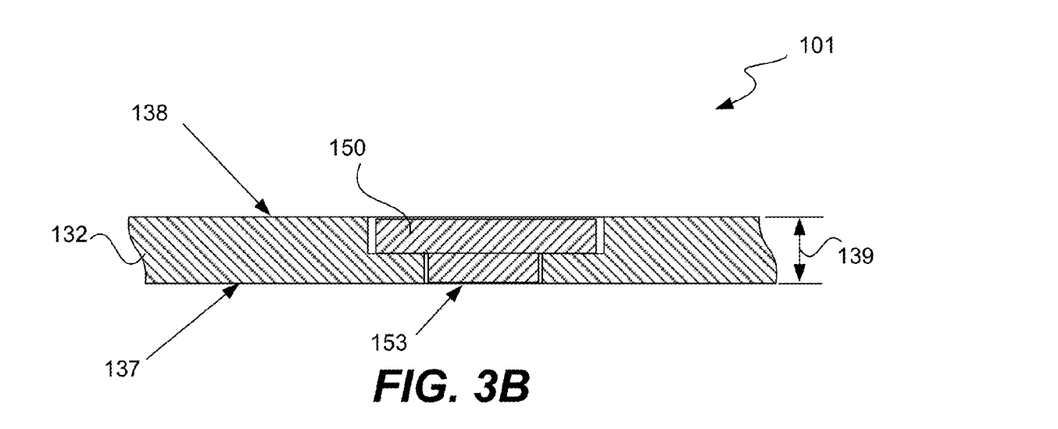
FIG. 3B illustrates in side cross-sectional view the fitted cosmetic logo insert and opening of FIG. 3A according to one embodiment of the present invention.

FIG. 3B illustrates in side cross-sectional view the fitted cosmetic logo insert and opening of FIG. 3A. Arrangement 101 reflects the cosmetic logo insert 150 as being fitted within the opening of wall 132. Cosmetic logo insert 150 can be formed from a single piece of material, which can be a firm plastic, for example. Wall 132 and insert 150 can both have a generally consistent thickness 139, and the insert is fitted in place such that an aesthetically pleasing, flat and finished surface 153 is presented at the exterior of the device. Surface 153 can generally be in the shape of a logo, such as the Apple® logo.

Figure 3C:
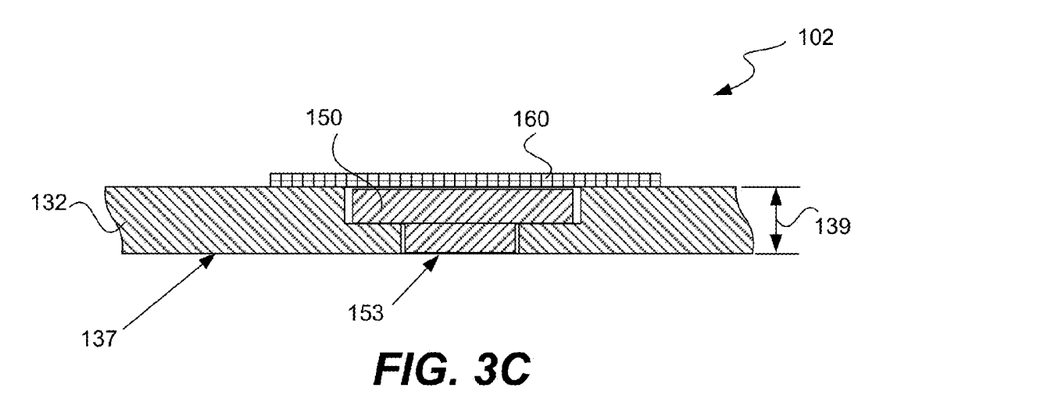
FIG. 3C illustrates in side cross-sectional view the arrangement of FIG. 3B with an exemplary added protection layer according to one embodiment of the present invention.

FIG. 3C illustrates in side cross-sectional view the arrangement of FIG. 3B with an exemplary added protection layer according to one embodiment of the present invention. Arrangement 102 reflects the use of a protection layer 160 that can be coupled to a back surface of insert 150 at the interior of the computing device. Such a protection layer 160 can be formed from metal, such that the internal components of the computing device are protected from external shock impacts, and/or to complete an adequate fire enclosure in the event of an internal device failure. Protection layer 160 can also form a suitable electromagnetic shield protection for the opening it fills. Such a protection layer may become necessary in the event that the thickness 139 of the cosmetic insert 150 renders the material of the insert insufficient by itself to provide such protective features.

Figure 4A:
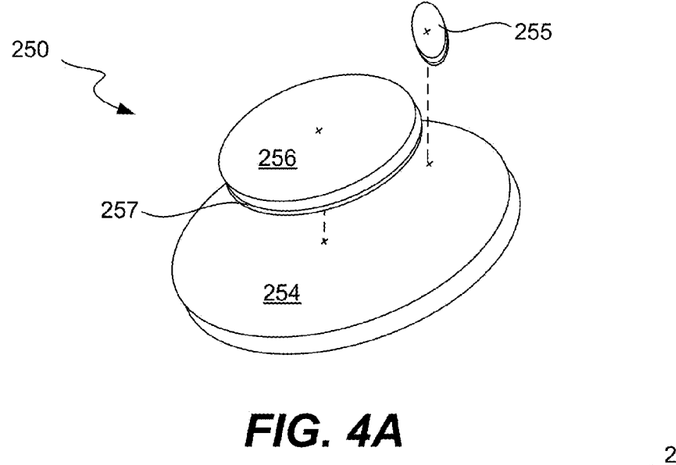
FIG. 4A illustrates in exploded perspective view an exemplary multiple piece cosmetic logo insert according to one embodiment of the present invention.

Continuing with FIG. 4A an exemplary multiple piece cosmetic logo insert is shown in exploded perspective view. Multiple piece insert 250 is an alternative design that can be used where a thinner cosmetic insert is desired, such that the plastic material used to form the insert has insufficient strength and may break while in use. Accordingly, a thin metal plate 254 is used as a strengthening backing for one or more thin plastic components 255, 256 that form the shape of the cosmetic logo. A thin adhesive or other similar material 257 serves to couple the metal plate 254 and plastic cosmetic components 255, 256.

Figure 4B:
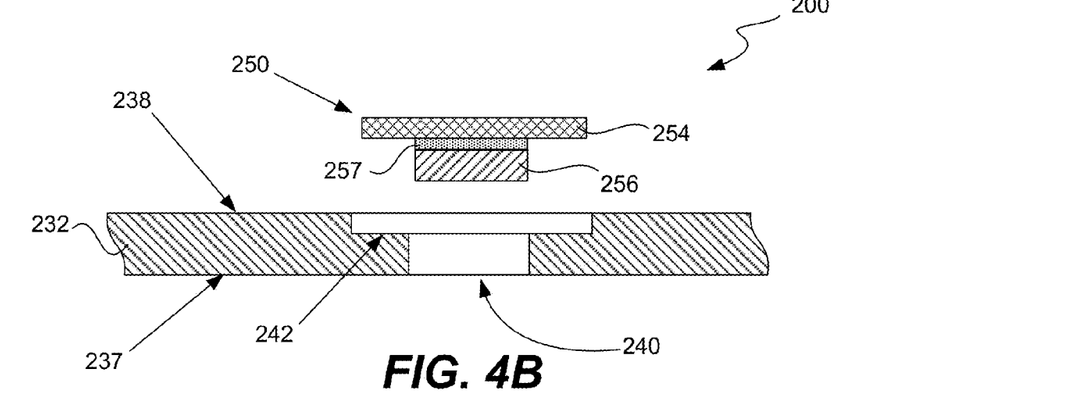
FIG. 4B illustrates in side cross-sectional view the assembled multiple piece cosmetic logo insert of FIG. 4A and an exemplary opening sized therefor in an outer housing component according to one embodiment of the present invention.

FIG. 4B illustrates in side cross-sectional view the assembled multiple piece cosmetic logo insert of FIG. 4A and an exemplary opening sized therefor in an outer housing component. Unassembled arrangement 200 can include an assembled multiple piece insert 250 includes a thin metal backing plate 254 that provides structural support for one or more cosmetic components 256. An adhesive layer 257 combines the metal plate 254 and cosmetic component(s) 256. Similar to the foregoing embodiment, an outer housing wall 232 can include an outer surface 237, inner surface 238 and stepped opening 240 having a step region 242 to facilitate fitting and fastening of the insert 250.

Figure 4C:
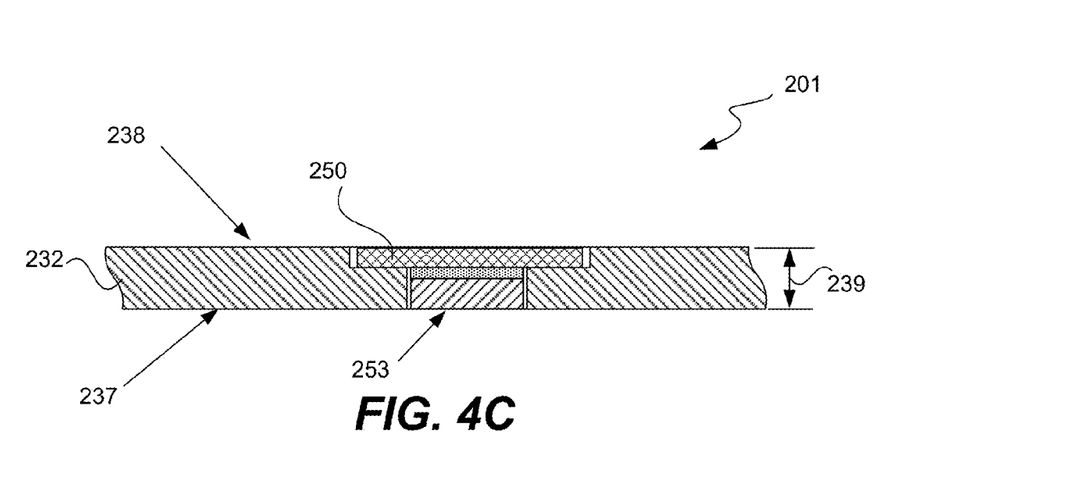
FIG. 4C illustrates in side cross-sectional view the fitted cosmetic logo insert and opening of FIG. 4B according to one embodiment of the present invention.

FIG. 4C illustrates in side cross-sectional view the fitted cosmetic logo insert and opening of FIG. 4B according to one embodiment of the present invention. Assembled arrangement 201 involves the cosmetic logo insert 250 being fitted and fastened into the opening in wall 232. Similar to the foregoing embodiment, the housing wall 232 and insert 250 can have a relatively consistent thickness 239, which can be thinner than the thickness of the foregoing embodiment involving an all plastic single piece cosmetic logo insert. Again, cosmetic logo insert 250 can be fitted in place such that an aesthetically pleasing, flat and finished surface 253 is presented at the exterior of the device.

Figure 5A:
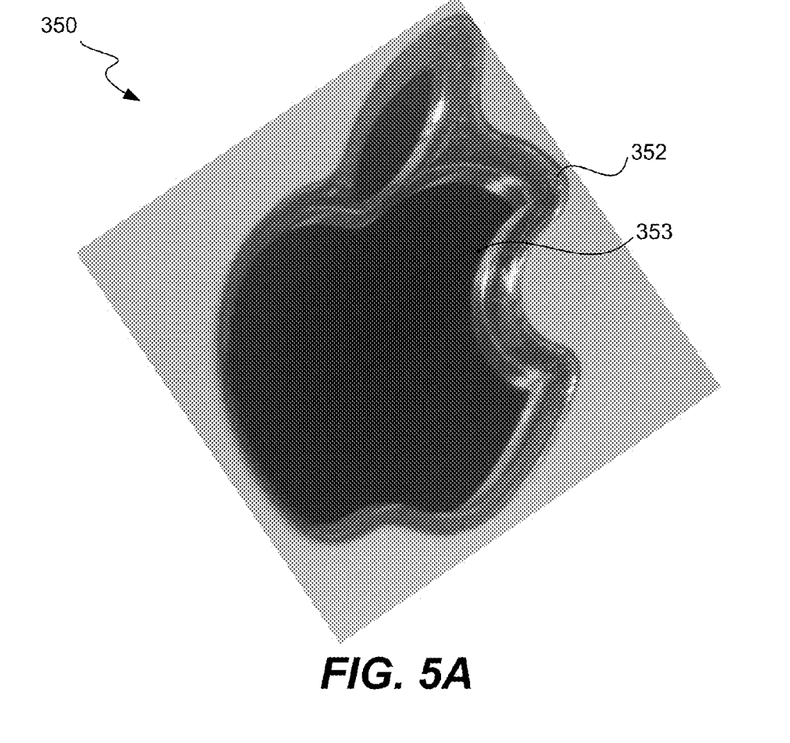
FIG. 5A illustrates in front perspective view an exemplary single piece high strength cosmetic logo insert according to an alternative embodiment of the present invention.

Turning now to FIG. 5A an exemplary single piece high strength cosmetic logo insert according to an alternative embodiment of the present invention is depicted in front perspective view. Cosmetic logo insert 350 can be particularly thin, strong and formed from a single integrated piece of material. Cosmetic logo insert 350 can have an upper region 352 and a lower region having a polished or otherwise finished surface 353 in the shape of a logo, such as, for example, the Apple® logo. In various embodiments, cosmetic logo insert 350 can have a generally consistent thickness of about 0.8 mm or less. In some embodiments, this thickness can be as low as 0.1 mm, or can range anywhere from 0.1 to 0.8 mm.

Such a relatively thin insert can allow for thinner outer enclosure wall designs and greater internal space within the computing device without sacrificing the use of such cosmetic logo inserts fitted into device housing openings.

Because it is desirable for cosmetic logo insert 350 to be thin, yet provide by itself adequate shock impact, fire enclosure protection, and/or electromagnetic shield protection at a housing opening where it is fitted, this insert can be formed from a strong material such as steel, aluminum or any other suitable metal or material. As such, no separate metal backing may be needed for use in conjunction with insert 350, unlike the embodiments of FIGS. 3C through 4C. Such a steel, aluminum or other metal insert 350 can be formed from a single integrated material, and can have a thickness of less than about 0.8 mm, going as low as 0.1 mm.

Figure 5B:
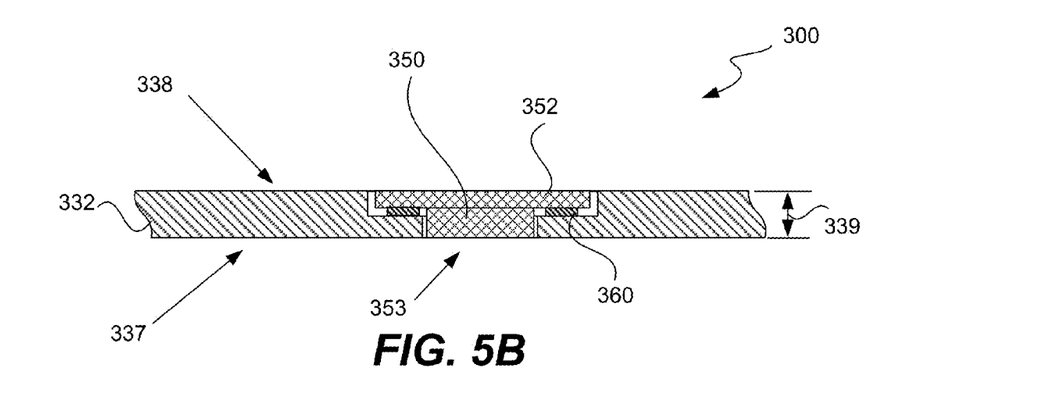
FIG. 5B illustrates in side cross-sectional view the single piece high strength cosmetic logo insert of FIG. 5A as inserted into a suitable opening in an outer housing according to one embodiment of the present invention.

Continuing with FIG. 5B, the single piece high strength cosmetic logo insert of FIG. 5A is shown in side cross-sectional view as being inserted into a suitable opening in an associated outer housing. Arrangement 300 reflects an assembled cosmetic logo insert 350 within an outer housing wall 332 having an outer surface 337, an inner surface 338 and a thickness 339. Upper region 352 can be located proximate the inner region of the computing device, while finished surface 353 presents a well finished and aesthetically pleasing logo shape to a device user or viewer. One or more adhesives 360 can serve to fasten the insert 350 within the opening of the housing device wall 332. As noted above, the thickness of the cosmetic logo insert 350 can be as low as 0.1 mm, or can range anywhere from 0.1 to 0.8 mm, which corresponding results in the ability of the wall thickness 339 to similarly be as low as 0.1 mm or to range anywhere from 0.1 to 0.8 mm.

Various features in the insert 350 and opening in housing wall 332 can be seen from FIGS. 5A and 5B. For example, the cross-sectional area of the opening at the inner surface is greater than the cross-sectional area of the opening at the outer surface. In addition, the opening comprises a stepped opening having an inner region proximate the inner surface and an outer region proximate the outer surface, wherein the inner region has a cross-sectional area that is different than the cross-sectional area of the outer region. In particular, the cross-sectional area of the inner region is greater than the cross-sectional area of the outer region. In alternative embodiments, the cross-sectional area can simply be different, such that a step is created to aid in the fastening of the insert within the opening. In still other embodiments, a conical shape to the opening can be created.

Various details of the insert 350 can include the upper portion 352 having a first shape and one or more lower portions having a second shape that is smaller and at least partially concentric with the first shape. As shown, multiple lower portions can include an apple and a leaf shape, so as to form an Apple logo. Furthermore, the difference in size between and relative arrangement of the first shape and the second shape can result in a flange in the upper portion around the lower portion. Such a flange can aid in the coupling of the insert to the housing within the opening. Again, cosmetic logo insert 350 can be fitted and fastened in place such that an aesthetically pleasing, flat and finished surface 353 is presented at the exterior of the device. Such a surface can be finished prior to or after insertion into housing wall 332.

Figure 6A:
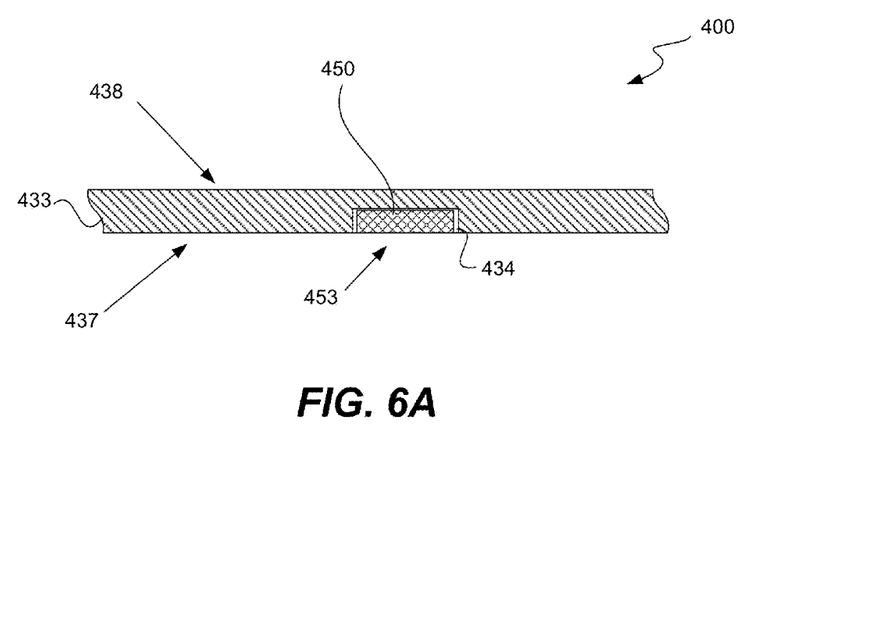
FIG. 6A illustrates in side cross-sectional view an exemplary single piece high strength cosmetic logo insert according to another alternative embodiment of the present invention.
Figure 6B:
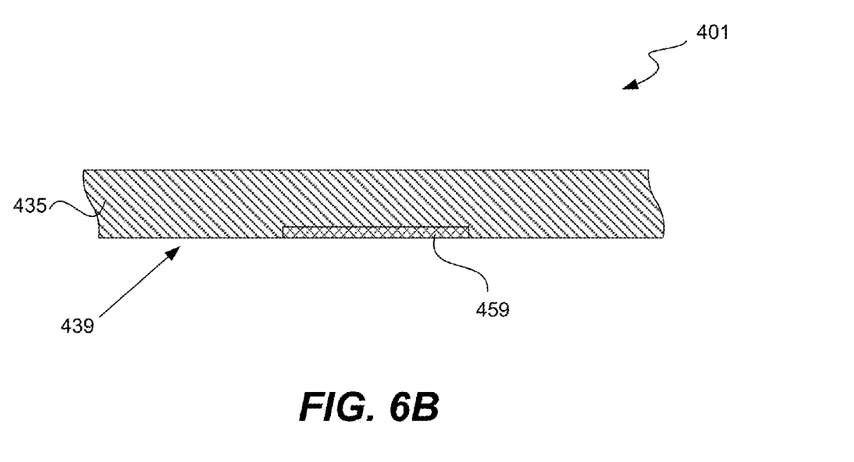
FIG. 6B illustrates in side cross-sectional view an exemplary single piece high strength cosmetic logo insert according to still another alternative embodiment of the present invention.

FIGS. 6A and 6B both illustrate in side cross-sectional view exemplary single piece high strength cosmetic logo inserts according to still other alternative embodiments of the present invention. As shown, both of arrangements 400 and 401 provide housings with insert openings that do not extend all the way through the wall of the housing. Referring first to FIG. 6A, arrangement 400 includes an outer housing wall 433 having an outer surface 437, an inner surface 438 and a blind recess 434 in the outer surface that does not extend through to the inner surface. Thin cosmetic logo insert 450 can be inserted into blind recess 434 and can be fastened therein by way of an adhesive, press fit, or other suitable fastening structure. Again, such a cosmetic insert can be constructed of metal or other strong material, such that the overall thickness can be about 0.8 mm or less. In particular, a thickness of about 0.1 to 0.8 mm can be possible. Similar to the foregoing embodiments, cosmetic logo insert 450 can be fitted in place such that an aesthetically pleasing, flat and finished surface 453 is presented at the exterior of the device. Again, such a surface 453 can be finished prior to or after insertion into housing wall 332.

FIG. 6B depicts arrangement 401 having a cosmetic surface 459 that is finished or coated locally on an outer surface 439 of the enclosure 435. In such an arrangement 401, a logo or other shape 459 can be formed as a cosmetic surface by way of machining, polishing, masking, coating and/or other finishing steps. For example, the outer surface 439 can be selectively masked and coated to add color, a hard coating and/or environmental seal to the logo or other shape forming cosmetic surface 459. In some embodiments, one or more finishing processes can involve finishing the surface of coating or ultrathin insert 459 as well as the outer surface 439 of the housing 435 together.

Figure 7:
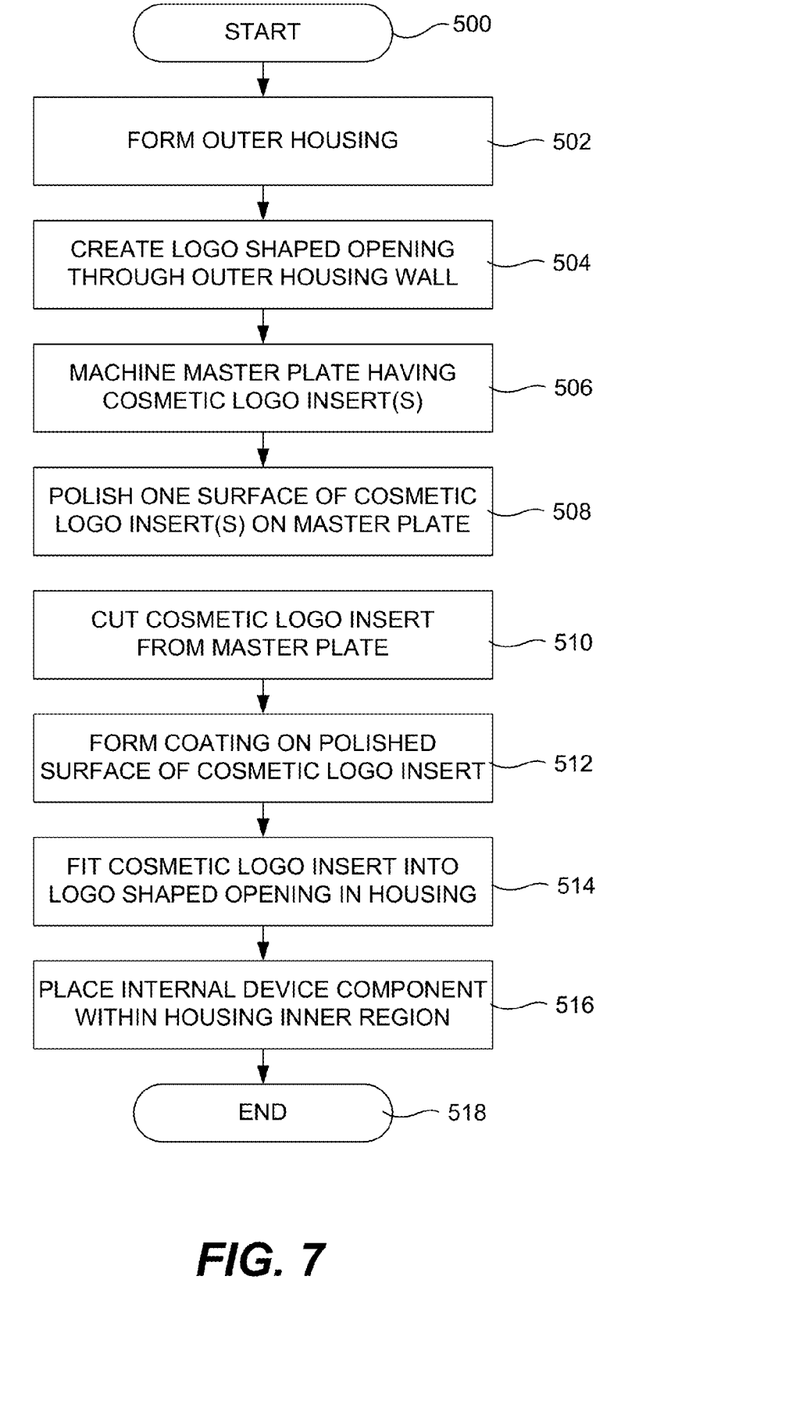
FIG. 7 provides a flowchart of an exemplary method of manufacturing a computing device according to one embodiment of the present invention.

Lastly, FIG. 7 provides a flowchart of an exemplary method of manufacturing a computing device according to one embodiment of the present invention. It will be understood that the provided steps are shown only for purposes of illustration, and that many other or different steps may be included in the process, as may be desired. Furthermore, the order of steps may be changed where appropriate and not all steps need be performed in various instances. For example, steps 502 and 504 may be performed after steps 506 through 512, while step 516 may be performed at several different points in the process. Other differences may also be possible, and it will be readily appreciated that the described steps and order are not limiting.

After a start step 500, an outer housing for the computing device can be formed at process step 502. Again, such an outer housing can have an inner region for containing various internal components of the computing device. At process step 504, a logo shaped opening can be created in the wall of the outer housing. Various details for such an opening can apply, as set forth in the various embodiments above. Process step 506 then involves machining a master plate having one or more cosmetic logo inserts thereon. The master plate can be formed from steel, aluminum or some other high strength material. In some instances, this can involve the CNC machining of a master plate having multiple inserts, such as in a mass manufacturing process.

At subsequent process step 508, a common surface of all of the cosmetic logo inserts can be polished or lapped while still part of the master plate. Such a polishing or lapping can result in a mirrored finish for the common surface of the cosmetic logo inserts, such a surface intended to be the outer surface upon installation to an associated computer outer housing. At process step 510, the cosmetic logo inserts are cut or punched from the master plate to form individual inserts, and a cosmetic coating can then be applied to the polished surface of the cosmetic logo insert at process step 512. Such a coating can be formed by way of particle vapor deposition, for example, although other types of coatings can also be used. Alternatively, no coating may be used as well.

At the following process step 514, a single unitary integrated cosmetic logo insert is then fitted into the logo shaped opening in the outer housing wall. In addition, various internal device components can be placed within the inner region of the outer housing at process step 516. The method then ends at end step 518.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A computing device, comprising:
   an outer housing adapted to contain a plurality of internal device components therein, wherein the outer housing includes a wall having an outer surface and an inner surface;
   a logo shaped opening through the wall, wherein the logo shaped opening comprises a stepped opening having an inner region proximate the inner surface and an outer region proximate the outer surface, and wherein the inner region has a cross-sectional area that is greater than the cross-sectional area of the outer region; and
   a cosmetic housing insert formed from a single piece of material and secured within the logo shaped opening to form a part of a completed overall housing for the computing device, wherein the cosmetic housing insert includes an upper portion having a first shape and a lower portion having a shape corresponding to the logo shaped opening, the lower portion being smaller and at least partially concentric with the first shape of the upper portion.

2. The computing device of claim 1, wherein the cosmetic housing insert further includes a plurality of separate lower portions.

3. The computing device of claim 1, wherein a difference in size between and relative arrangement of the first shape of the upper portion and the shape of the lower portion results in a flange in the upper portion around the lower portion.

4. A method of manufacturing a computing device, comprising:
   forming an outer housing having an inner region and an opening through a wall thereof, wherein the opening has a shape in the form of a logo;
   placing a plurality of internal device components within the inner region of the outer housing;
   machining material away from a master plate formed from a single piece of metal to at least partially define a cosmetic logo insert;
   polishing a surface of the cosmetic logo insert;
   separating the cosmetic logo insert from the master plate;
   forming a coating on the polished surface of the cosmetic logo insert; and
   securing the cosmetic logo insert into the opening of the outer housing.

5. The method of claim 4, wherein securing the cosmetic logo insert comprises adhesively coupling the cosmetic logo insert to an interior facing surface of the outer housing.

6. The method of claim 4, wherein the cosmetic logo insert includes a plurality of protrusions extending from a surface of the cosmetic logo such that a distal end of each of the plurality of protrusions cooperate to define the logo.

7. The method of claim 4, wherein the cosmetic logo insert provides by itself shock impact and fire enclosure protection at the opening for at least one of the plurality of internal device components.

8. A computing device, comprising:
   a housing adapted to contain a plurality of internal device components therein, wherein the housing includes a wall having an outer surface and an inner surface, and defines a wall opening extending through the outer and inner surfaces of the wall;
   a housing insert formed from a single piece of metal, the housing insert comprising:
      a lower portion fitted within the wall opening to form a part of a completed overall housing for the computing device such that an external face of the lower portion cooperates with the outer surface of the housing to create a continuous surface across the outer surface of the housing, and
      an upper portion having a perimeter larger than a perimeter of the lower portion and being coupled directly to the inner surface of the wall.

9. The computing device of claim 8, wherein an internal face of the housing insert cooperates with the inner surface of the housing wall to create a continuous surface across the inner surface of the housing wall.

10. The computing device of claim 8, wherein a cross-sectional area of the wall opening at the inner surface is greater than a cross-sectional area of the wall opening at the outer surface.

11. The computing device of claim 8, wherein the wall opening comprises a stepped opening having an inner region proximate the inner surface and an outer region proximate the outer surface, and wherein the inner region has a cross-sectional area that is different than the cross-sectional area of the outer region.

12. The computing device of claim 11, wherein the cross-sectional area of the inner region is greater than the cross-sectional area of the outer region.

13. The computing device of claim 8, wherein the housing insert is adhesively coupled to the inner surface of the wall.

14. The computing device of claim 8, wherein the housing insert further includes a plurality of separate lower portions, the plurality of separate lower portions being positioned within corresponding ones of a plurality of wall openings defined by the wall, the plurality of separate lower portions cooperating to define a logo shape along the outer surface of the wall.

15. The computing device of claim 8, wherein a difference in size between and relative arrangement of the lower portion and the upper portion results in a flange in the upper portion around the lower portion.

16. The computing device of claim 15, wherein the flange of the housing insert interacts with a portion of the wall that defines the wall opening of the housing to retain the housing insert within the housing of the portable computing device.

17. A cosmetic logo insert suitable for use with a portable computing device, the cosmetic logo insert comprising:
   an upper portion defining a surface;
   a first lower portion protruding from the surface; and
   a second lower portion protruding from the surface proximate the first lower portion,
   wherein distal ends of the first and second lower portions cooperate to define a logo, and wherein the first and second lower portions of the cosmetic logo insert are adapted to fit within a first and a second opening defined by a housing of the portable computing device so that the distal ends of the first and second lower portions are arranged along an exterior surface of the housing.

18. The cosmetic logo insert as recited in claim 17, wherein the distal ends of the first and second lower portions have a curvature in accordance with the exterior surface of the housing proximate the first and second openings.

19. The cosmetic logo insert as recited in claim 18, wherein the curvature of the distal ends of the first and second lower portions are shaped to accommodate a curved exterior surface of the housing surrounding the first and second openings.

20. The cosmetic logo insert as recited in claim 17, wherein the surface of the upper portion between the first and second lower portions is configured to interact with an interior surface of the housing between the first and second openings to retain the cosmetic logo insert within the housing of the portable computing device.

* * * * *